Aug. 1, 1961 H. FRENCK 2,994,293
LASHING HOOK
Filed April 30, 1958

INVENTOR.
HAROLD FRENCK
BY
ATTORNEY

United States Patent Office

2,994,293
Patented Aug. 1, 1961

2,994,293
LASHING HOOK
Harold Frenck, 250 North Ave., Syracuse, N.Y.
Filed Apr. 30, 1958, Ser. No. 731,933
2 Claims. (Cl. 114—218)

This invention relates to a lashing hook, and more particularly to a lashing hook adapted to cooperate with grommet cords of canvas coverings for boats and the like.

In respect to small open boats, exposed to the weather, it is the practice to apply a canvas cover to exposed portions of such craft when not in use. Such cover is shaped to fit and extend over the edges of the open cockpit or other parts requiring protection, and the edges of such cover are provided with slightly elastic grommet cord extending along the edges of the cover, such cord being so characterized by reason of the same being interlaced through spaced grommets disposed along the marginal edge of the cover, to provide cord loops. The loops are adapted to be placed over hooks or the like permanently affixed at spaced intervals along the outside of the craft, or elsewhere where it is desired to lash such a cover to the craft by the grommet cord affixed to the canvas cover.

Ordinary hooks heretofore employed for the purpose depend on tension to hold the grommet cord in position within the hook, and any slackening of tension has tended to permit the lashing cord to slip from one or more of the hooks. Such cords or the loops thereof are generally under tension in all hooks, once the cord loops are engaged in all of the hooks. However, during the application of the cord loops to the many hooks, a failure to maintain tension results in the cord slipping from one or more hooks while attempting to lash the cord loops within the remaining hooks.

The present invention is directed to a lashing hook adapted to cooperate with grommet cord of a circular cross section the hook being so constructed as to also cooperate with the boat side to provide a slight restriction to the placing or displacing of a grommet cord loop within the hook. The invention further has to do with the construction of a grommet hook of such shape as to be equally effective on lap strake or smooth side craft.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1:
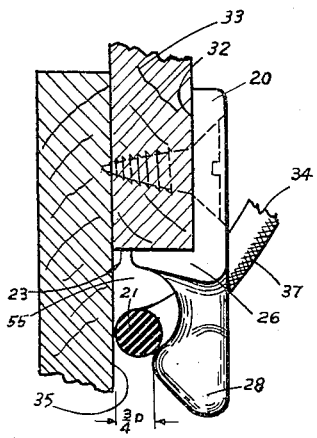
FIGURE 1 is a fragmentary sectional view through a portion of a lap strake boat side showing the lashing hook applied thereto.
Figure 3:
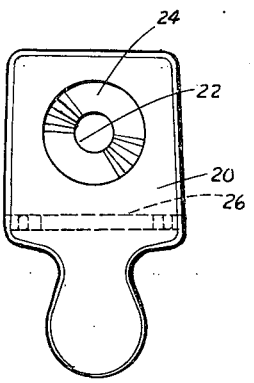
FIGURE 3 is a top plan view of the lashing hook.
Figure 4:
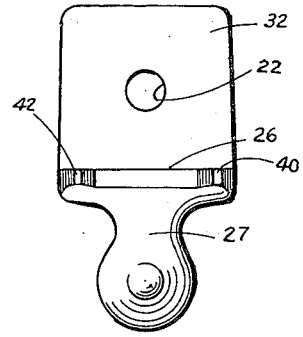
FIGURE 4 is a bottom plan view.
Figure 2:
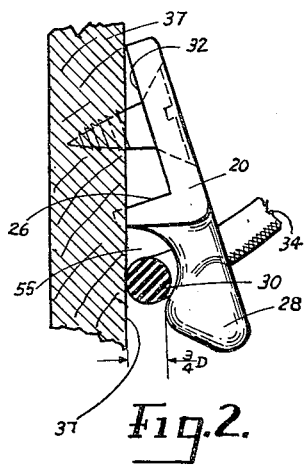
FIGURE 2 is a fragmentary sectional view through a portion of a smooth side boat showing the lashing hook applied thereto.
Figure 5:
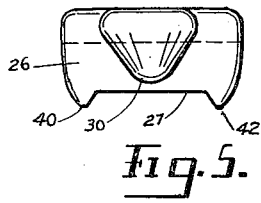
FIGURE 5 is an end elevational view.

Referring to the drawings there is shown, in FIGURE 1, the lashing hook applied to the side of a lap strake boat with a grommet cord loop 21 engaged thereunder. The hook comprises a base or main body portion 20, somewhat trapezoidal in shape, the base having a central opening as at 22 suitably counter-sunk as at 24 to receive a wood screw or the like. The base at one end is provided with a flange 26 adapted to engage the lower edge 23 of one lap 33 of a lap strake boat, and securing the hook from rotation when secured by a single screw in aperture 22 to the lap, such as 33. The base extends as by an arm 27, beyond the flange to provide a support for an integral conical nose as at 28, rounded at its ends as at 30, such nose having a conical wall extending about 60° to the axis, and projecting in a direction normal to the plane of the base 20.

The length of such nose, in reference to the under surface 32 of the base 20, is such as to be spaced from the lap 35 below (see FIGURE 1), a distance about ¾ of the diameter D of the grommet cord 34, for which the hook is designed.

Such grommet cord 34 in practice is composed of a multiplicity of filaments of rubber or rubber-like material having limited elasticity, such filaments being bundled and covered by a tight braid 37. If grommet cord having an overall diameter of 3/16" is to be employed, the spacing between the nose 30 and the surface of the adjacent lap 35 will be about 9/64".

The flange 26 of the grommet hook is of such a width, and provided with spaced points 40 and 42 so as to be adaptable to application to smooth side craft in which case the plane of the base of the hook is inclined in reference to the surface 37. By reason of the width of the flange 26, the spacing of the hook nose from the surface 37 by the distance of 9/64" when mounted on a smooth side is retained, when the points 40 and 42 are embedded in the surface 37 to prevent rotation and the flange edge 27 is seated against the surface 37.

Figure 6:
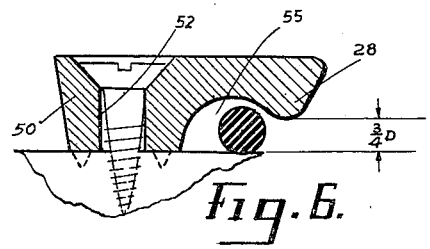
FIGURE 6 is a modified form of lashing hook shown in section on the line 6—6 of FIGURE 7 and applied to a smooth side surface.
Figure 7:
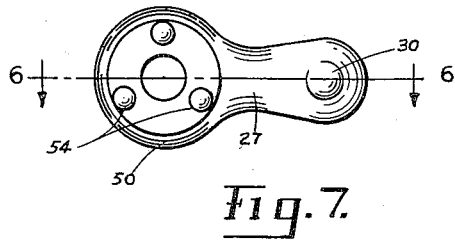
FIGURE 7 is a bottom plan view of the modified form of FIGURE 6.

In the modified form shown in FIGURES 6 and 7, the hook has a slightly tapered and circular body portion 50, having an aperture 52 to receive a fastening screw. The body portion at its smaller end is provided with a plurality of small points 54 (three being shown) to engage and embed in the boat side and prevent rotation of the hook when drawn down tight. The body portion is provided with a radially extending arm 27, having an inwardly directed rounded nose, adapted to be spaced from the boat side 9/64" as before, when adapted for use with grommet cord of 3/16" diameter.

The hooks may be cast of aluminum or formed of other material suitable to resist the effects of the sea. As many hooks may be placed along the side of the craft as seem desirable to effectively lash a canvas cover thereto. The number and spacing of such hooks will correspond to the number and spacing of the grommet cord loops.

It will be appreciated that with hooks of the type shown, applied to a craft, one may secure a cover along one side of a craft, while within the craft, and may secure the other side of the cover along the other side of the craft, after disembarking from the craft, all without risk of the loops already secured dropping out from under the hooks due to unintentional slackening of the pull of the canvas cover and one or more loops of its cord which have already been lashed to hooks. At the same time adequate clearance beneath the arm as at 55 is provided for freedom of movement, once the grommet cord is yieldingly moved past the nose and into the space behind and the loops are readily removed from such hooks by yielding deformation of the circular cross section of the grommet cord, so as to slide under the nose 30.

While several embodiments of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A lashing hook, for sea craft comprising an integral cast member having a relatively flat base portion having a central aperture therethrough to receive a fastening screw, and an integral flange portion extending at a right angle to said base portion along one side of the base portion and terminating in a straight edge, said base portion also having a straight edge along the opposite side extending parallel with the flange edge, an integral arm portion extending laterally from the flange side of the base and beyond the flange portion, and a conical nose portion integrally formed on said arm, on an axis substantially parallel with the plane of the flange, said nose portion being rounded and extending axially from said arm a distance less than the width of said flange.

2. In a lashing hook for sea craft, in combination with a mounting surface, a lashing hook having a body portion rigidly affixed to said surface, said body portion having a flat surface and projecting points bearing against said mouting surface, a lateral integral arm extending from said body portion and spaced from said surface to provide space for a lashing cord resiliently yieldable in cross section and of a diameter slightly less than said spacing, and an integral inwardly directed nose of conical and rounded tip configuration formed on said arm and projecting toward, and spaced from said body portion by a distance greater than said cord diameter, the rounded tip of said nose being spaced from said surface a distance approximately three-fourths of the diameter of said cord for said spacing.

References Cited in the file of this patent

FOREIGN PATENTS 835,408     Germany _____ Mar. 31, 1952